March 1, 1960 D. HELBERG 2,926,432
DEVICE FOR DEMONSTRATING FRACTIONS AND DECIMAL EQUIVALENTS
Filed May 6, 1958
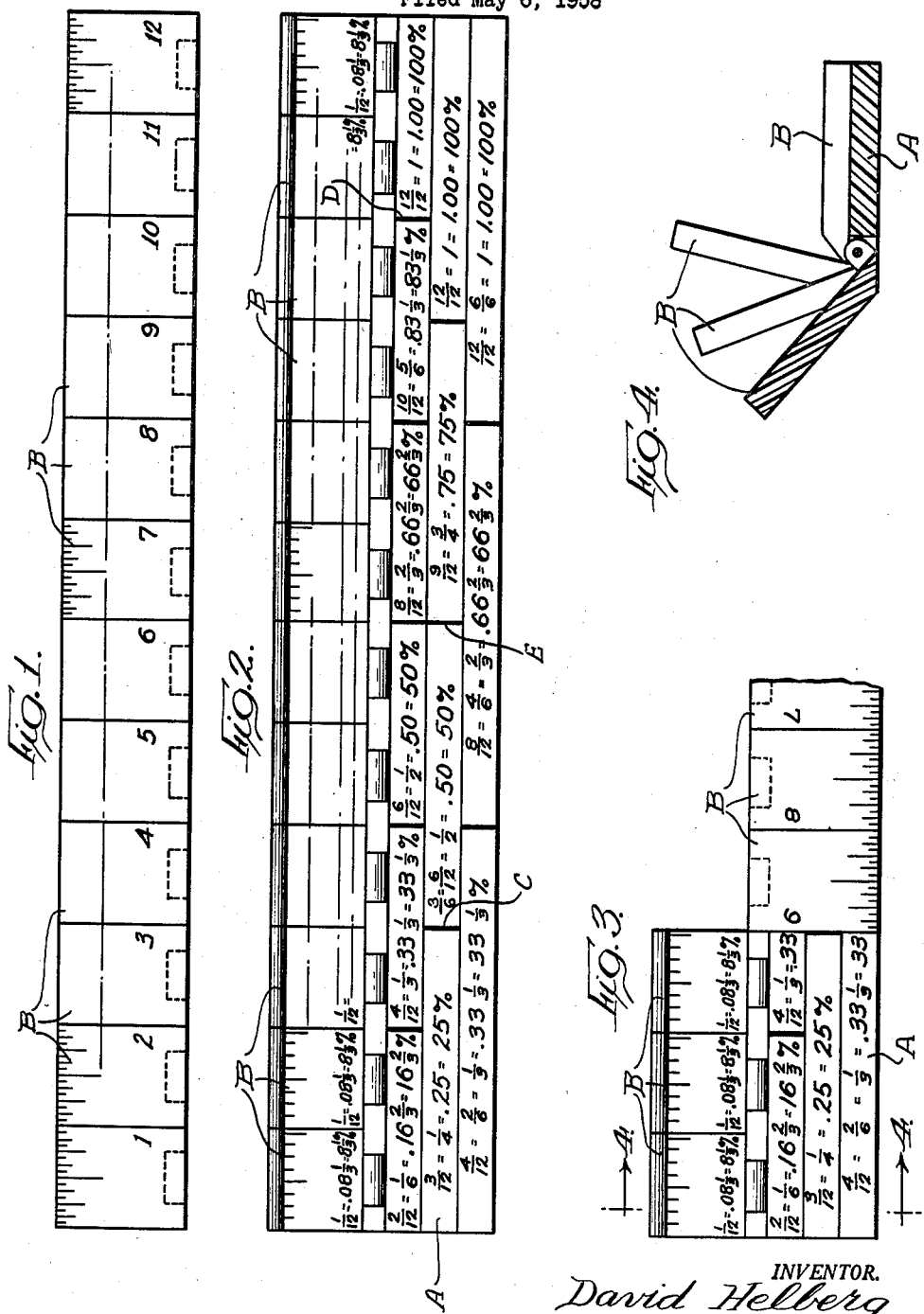
INVENTOR.
David Helberg
BY
Attys.

United States Patent Office 2,926,432
Patented Mar. 1, 1960

2,926,432
DEVICE FOR DEMONSTRATING FRACTIONS AND DECIMAL EQUIVALENTS

David Helberg, Skokie, Ill.

Application May 6, 1958, Serial No. 733,293

4 Claims. (Cl. 35—31)

This invention relates to a simplified device for use in the instruction of young students in arithmetic fractions and decimal equivalents. More particularly, it is directed to a device which can be inexpensively manufactured and, therefore, made available to an entire class of grade school students at a very small cost. Specifically, the present invention concerns a device which can be employed to graphically demonstrate the meaning and application of fractional parts of the whole.

For some reason, not entirely understood even by those actively engaged in the teaching profession, the fractional parts of a whole number cause an amount of difficulty on the part of the student quite out of proportion to the actual complexities involved. Thus, in the middle grades of grammar school where the student is first confronted with the concept of adding and subtracting fractions from one another and from whole numbers, a considerable impasse is often presented to the teacher because of an inability to demonstrate the significance and interrelationship of these fractional parts. One of the principal difficulties is the problem of different denominators in a series of fractions which are to be added or subtracted.

As is well known, before addition or subtraction of fractions is performed, it is most desirable that all of the fractions be reduced to a common denominator. Thus, for example, if a student were presented with the problem of adding the following fractions:

$$\frac{1}{4} + \frac{3}{12} + \frac{5}{12} + \frac{2}{3}$$

the problem might appear almost insurmountable to one of a young age unless all of the denominators were reduced to the lowest common figure by which all of them are divisible. Thus, the lowest common denominator of the four fractions above is obviously 12; and if the above four fractions were modified to read in terms of $\frac{1}{12}$, the problem would immediately become substantially simpler and would appear as follows:

$$\frac{3}{12} + \frac{3}{12} + \frac{5}{12} + \frac{8}{12}$$

The same problem exists with other fractions wherein denominators other than those illustrated above are encountered.

An object of the present invention is to provide a device whereby any series of fractions can be visually observed in relation to the whole.

A further object is to provide a simple device having a minimum of moving parts which will enable a youngster to better understand the significance and relationship of the fractional parts of whole numbers. These and additional objects and advantages will become apparent as the ensuing description proceeds in connection with the accompanying drawings. In the drawings:

Figure 1 represents the plan view of the top side of the device herein described and claimed, showing twelve separate, hinged units arranged side by side in such manner as to form what appears to be a ruler twelve inches in length; the hinges are shown in dotted outline;

Fig. 2 is another plan view of the device after the twelve hinged units have been swung back to an angle of about 150° from their position in Figure 1 to reveal the base member which in Figure 1 is obscured thereby;

Fig. 3 is a fragmentary plan view similar to Figure 1 and Fig. 2 showing only three of the hinged units swung back and with the remainder of the units again lying flat on the base member; and Fig. 4 is a sectional, side elevation view taken along 4—4 in Fig. 3 but with second and third hinged units fanned away from the first to show that each unit is separately hinged and independently movable.

Briefly described, the device of the present invention consists of a base member fashioned from any suitable material of construction, such as plastic, wood, cardboard or the like which is, for example, 12 inches in length, about 1½ inches in width and ⅛ inch in thickness. On the base member is printed in the manner shown in the drawings and hereinafter discussed in detail various fractional equivalents in selected locations on the base member such that upon folding back two or more of the series of 12 units hingedly affixed to the edge of the base member, the appropriate fractional equivalent corresponding to the number of hinged units lifted from the face of the base member is revealed.

Referring now to the drawings in which a consistent numbering system is used to designate the various parts in all four figures, an illustrative embodiment of the invention is shown wherein a base member A, has hinged thereto along one edge a series of twelve identically-sized units numbered consecutively in Figure 1 and designated as B, which are adapted to lie flat on base member A, as shown in Figure 1, or to be swung back as shown in the other figures.

The utility of the device and its function of the printed indicia thereon is believed to be best understood in terms of actual examples of its use for instruction of young children in the science of arithmetic fractions.

Example I

A student is requested to convert $\frac{3}{12}$ to its lowest common denominator and to state its decimal equivalent. Holding the device, as it appears in Figure 1 but with the hinges away from him, he proceeds to flip the first three hinged units B back away from contact with base member A. When this has been accomplished the device appears as shown fragmentarily in Fig. 3. By observing where the heavy line C on the base member lines up with the edge of the fourth unit, i.e., the one which is still lying flat, the student knows immediately which of the rows or groups of numbers is applicable to his problem. In this particular case it will be readily observed the row of numbers "$\frac{3}{12} = \frac{1}{4} = .25 = 25\%$" is that which is bounded by the left-hand side of the ruler and the heavy line C. Thus, the students not only obtain the answer but visually observe that $\frac{3}{12}$ make up $\frac{1}{4}$ or 25% of the whole device.

Example II

Another typical problem is the addition of the following fractions:

$$\frac{10}{12} + \frac{1}{2} + \frac{1}{8} = X$$

The student can quickly and visually demonstrate to himself and thereby augment his understanding by taking the device as in Example I above but this time flipping the first 10 units. As soon as he has done so he finds the heavy line D—which it will be understood is sufficiently wide to appear beneath the left-hand edge of the eleventh unit and preferably in color. Just to the left of this line D in the upper row on the base member A can then be seen:

$$"10/12 = 5/6 = .83\tfrac{1}{3} = 83\tfrac{1}{3}\%"$$

and the student knows that $10/12 = 5/6$ and that he has reached the lowest common denominator. He now has $5/6 + 1/2 + 1/6$ and he need only convert the $1/2$ to its equivalent in sixths and he can proceed to add the fraction. Accordingly, he brings all of his hinged units back into face-to-face contact with the base member and proceeds to flip one after another back out of contact until he has revealed that section bounded on the right by the line E, and he immediately recognizes that $1/2 = 3/6$. The addition of $5/6 + 3/6 + 1/6$ to obtain $9/6$ or $1\tfrac{1}{2}$ then follows simply.

While the present invention has been described with respect to particular dimensions and 12 hinged units, it will, of course, be understood that it may be any size and contain any logical number of hinged units. Thus, the device could range in size from smaller than that described to one sufficiently large to use in front of a class or even larger. Likewise, depending upon the fractional equivalents which are being studied the number of units hinged thereto may be varied over a considerable range.

Thus, for explaining the metric system a device of this type with 10 or 100 hinged units is highly useful. And if the fractional parts of an inch are being studied, the number of units could be 16, 32, 64, etc., and the printed indicia would be appropriately modified to correspond.

The preferred material of construction is a stiff plastic, for example, polystyrene, and the hinge construction may be as shown or modified by the use of a suitable plastic binder of the type employed on notebooks, etc. It will be understood that the present invention does not reside in selection of material of construction or the particular hinging system.

The printed indicia may, of course, be placed on the surfaces of the device by any suitable means. Silk screen processing has been found especially useful on plastics such as polystyrene.

As may be seen in the illustrative embodiment of Fig. 1, when the twelve hinged units are lying flat against the base member the device may be employed as a ruler or straight edge. Since the hinging system may result in some irregularity along that edge the opposite edge therefrom is more desirably employed for that purpose.

Having thus described my invention, what I claim as novel and desire to protect by Letters Patent is as follows:

I claim as my invention:

1. A device for aiding in the instruction of students in the relationship and significance of the fractional parts of a whole number to the whole number which comprises, in combination, a planar base member representing the whole number and having at least one printable surface thereon, a plurality of units hingedly connected to said base member along an edge thereof, each of said units being adapted to substantially obscure the said printable surface of said base member contiguous thereto when pivoted into contact therewith, said printable surface having displayed thereon at locations corresponding to the linear distance along said base member at which the same appear a series of fractional equivalents corresponding to the number of hinged units affixed thereto.

2. A device for aiding in the instruction of students in the relationship of arithmetical fractions to the whole number which comprises, in combination, a planar base member having at least one printable surface thereon which represents the whole number, a plurality of cover-plates hingedly affixed to said base member along the same edge thereof and adapted to swing into contact with said base member, thereby obscuring the portion of said base member contiguous thereto, and a printed indicia on the surface of said base member contiguous to said cover-plates adapted to display the fractional equivalents of the whole number as the said cover-plates are consecutively swung away from contact with said base member, said fractional equivalent appearing on said printed surface of said base member at locations corresponding to the linear distance along said base member when the same appear.

3. The device of claim 2, wherein the base member is 12 inches in length and there are 12 cover-plates of one inch width hingedly connected thereto.

4. The device of claim 3 wherein the printed indicia includes fractional equivalents in terms of twelfths, sixths, fourths and thirds adapted to correspond to the number of hinged cover-plates contiguous thereto.

References Cited in the file of this patent

UNITED STATES PATENTS

| | | |
|---|---|---|
| 629,891 | Cunningham | Aug. 1, 1899 |
| 2,826,829 | Koons | Mar. 18, 1958 |

FOREIGN PATENTS

| | | |
|---|---|---|
| 312,239 | Switzerland | Feb. 29, 1956 |